United States Patent
Monti

(10) Patent No.: US 10,513,356 B2
(45) Date of Patent: Dec. 24, 2019

(54) APPARATUS FOR TRANSFER OF PHARMACEUTICAL ARTICLES FROM A COUNTING MACHINE TO INTERNALLY OF CONTINUOUSLY ADVANCING CONTAINERS

(71) Applicant: MARCHESINI GROUP S.p.A., Pianoro (Bologna) (IT)

(72) Inventor: Giuseppe Monti, Pianori (IT)

(73) Assignee: MARCHESINI GROUP S.P.A., Pianoro (Bologna) (IT)

( * ) Notice: Subject to any disclaimer, the term of this patent is extended or adjusted under 35 U.S.C. 154(b) by 124 days.

(21) Appl. No.: 15/576,785

(22) PCT Filed: May 26, 2016

(86) PCT No.: PCT/IB2016/053082
§ 371 (c)(1),
(2) Date: Nov. 24, 2017

(87) PCT Pub. No.: WO2016/189485
PCT Pub. Date: Dec. 1, 2016

(65) Prior Publication Data
US 2018/0305045 A1    Oct. 25, 2018

(30) Foreign Application Priority Data

May 27, 2015 (IT) .................... 102015000018152

(51) Int. Cl.
*B65B 5/10* (2006.01)
*B65B 39/14* (2006.01)
(Continued)

(52) U.S. Cl.
CPC ............. *B65B 5/103* (2013.01); *A61J 1/03* (2013.01); *B65B 39/145* (2013.01); *B65B 57/20* (2013.01);
(Continued)

(58) Field of Classification Search
CPC ....... B65B 5/103; B65B 57/20; B65B 39/145; A61J 1/03; A61J 7/02; B65G 47/38; B65G 47/841
See application file for complete search history.

(56) References Cited

U.S. PATENT DOCUMENTS 3,206,062 A * 9/1965 Rappaport ............. B65B 5/103
                                                      221/7
5,141,100 A * 8/1992 Campus ................. B61B 13/00
                                                      104/118
(Continued)

FOREIGN PATENT DOCUMENTS

EP       2128027 A1    12/2009
EP       2671807 A1    12/2013
(Continued)

*Primary Examiner* — Nicolas A Arnett
(74) *Attorney, Agent, or Firm* — R. Neil Sudol; Henry D. Coleman

(57) ABSTRACT

An apparatus for transferring pharmaceutical articles from a counting machine to containers advancing along a conveyor line comprises a first series of tubular elements and at least one second series of tubular elements able to receive the pharmaceutical articles internally thereof. The apparatus comprises a first looped movement organ for moving the first tubular elements and at least one independently activatable second looped movement organ for moving the second tubular elements both, a stepped fashion and continuously, and each defining a looped movement pathway for the tubular elements comprising a first straight path portion below the counting machine so that the tubular elements can be halted for receiving therefrom the counted articles, and a second straight path portion above the conveyor line, so that the tubular elements can be moved at the same velocity above the containers and release the articles therein.

9 Claims, 12 Drawing Sheets

(51) Int. Cl.
  *B65B 57/20* (2006.01)
  *A61J 1/03* (2006.01)
  *A61J 7/02* (2006.01)
  *B65G 47/38* (2006.01)
  *B65G 47/84* (2006.01)
(52) U.S. Cl.
  CPC ............... *A61J 7/02* (2013.01); *B65G 47/38* (2013.01); *B65G 47/841* (2013.01)

(56) References Cited

U.S. PATENT DOCUMENTS

| | | | | |
|---|---|---|---|---|
| 6,371,032 | B1* | 4/2002 | Graefer | B65G 17/345 |
| | | | | 105/141 |
| 2008/0156825 | A1* | 7/2008 | Monti | B65B 5/103 |
| | | | | 221/210 |
| 2008/0223003 | A1* | 9/2008 | Monti | B65B 5/103 |
| | | | | 53/281 |
| 2013/0056332 | A1* | 3/2013 | Cavina | B65G 19/02 |
| | | | | 198/731 |
| 2013/0175288 | A1* | 7/2013 | Monti | B23C 3/28 |
| | | | | 221/65 |
| 2013/0269831 | A1* | 10/2013 | Monti | B65B 1/08 |
| | | | | 141/94 |
| 2014/0298754 | A1* | 10/2014 | Van Wijngaarden | B65G 47/18 |
| | | | | 53/443 |
| 2015/0298839 | A1* | 10/2015 | Van De Koot | A61J 7/0084 |
| | | | | 198/347.1 |

FOREIGN PATENT DOCUMENTS

| WO | WO 2006/016268 A1 | 2/2006 |
|---|---|---|
| WO | WO 2011/110925 A1 | 9/2011 |

\* cited by examiner

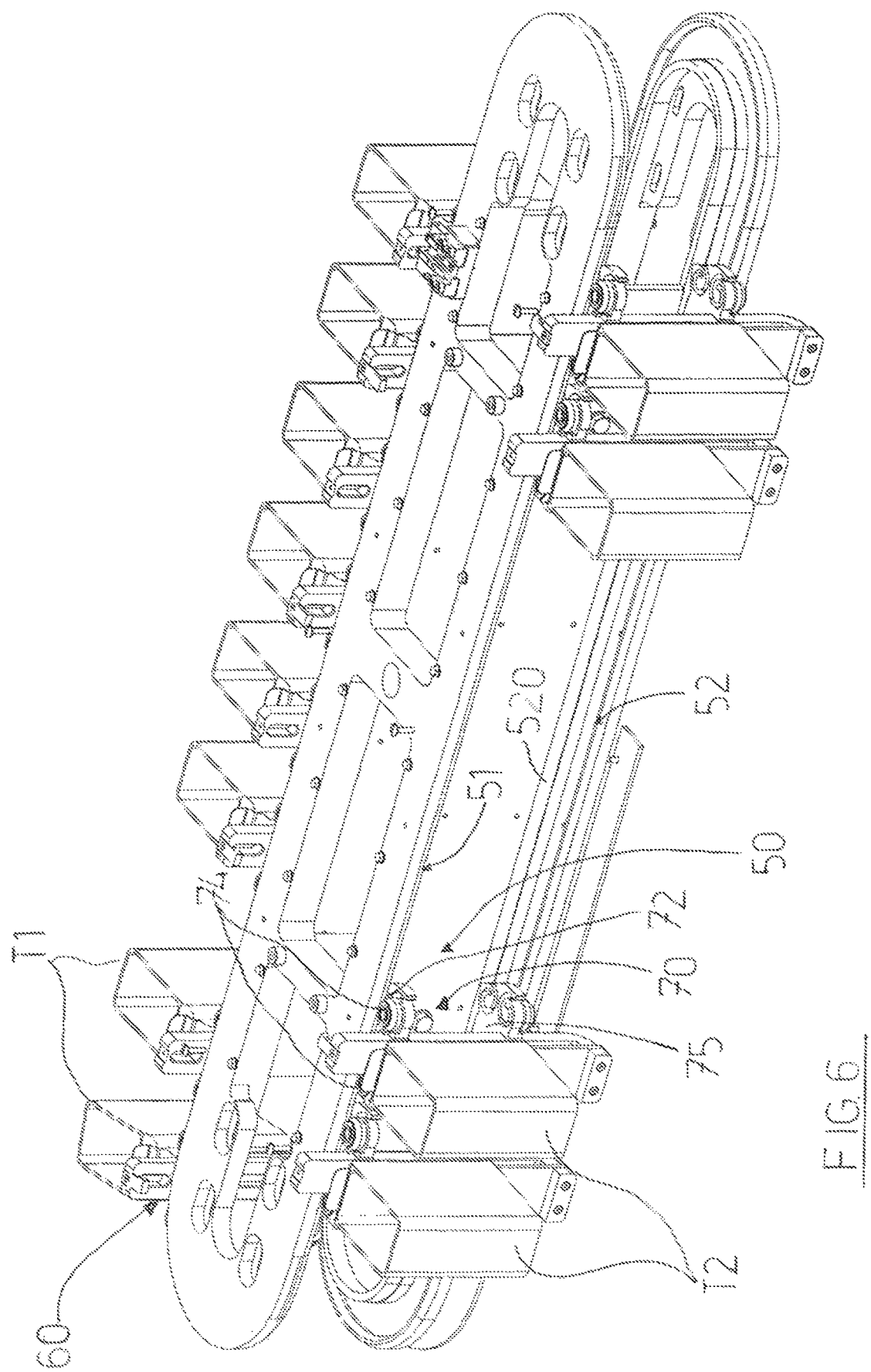

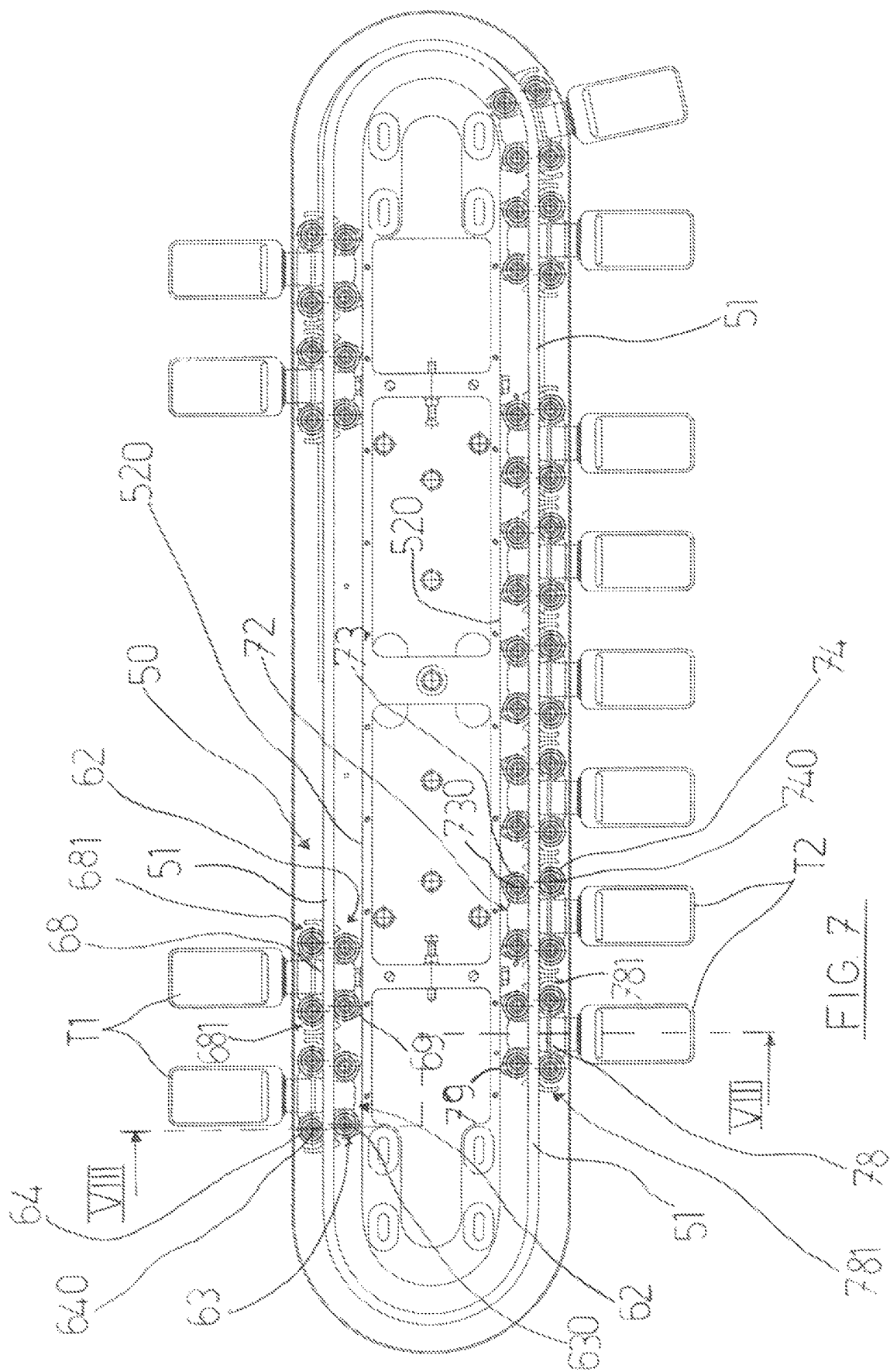

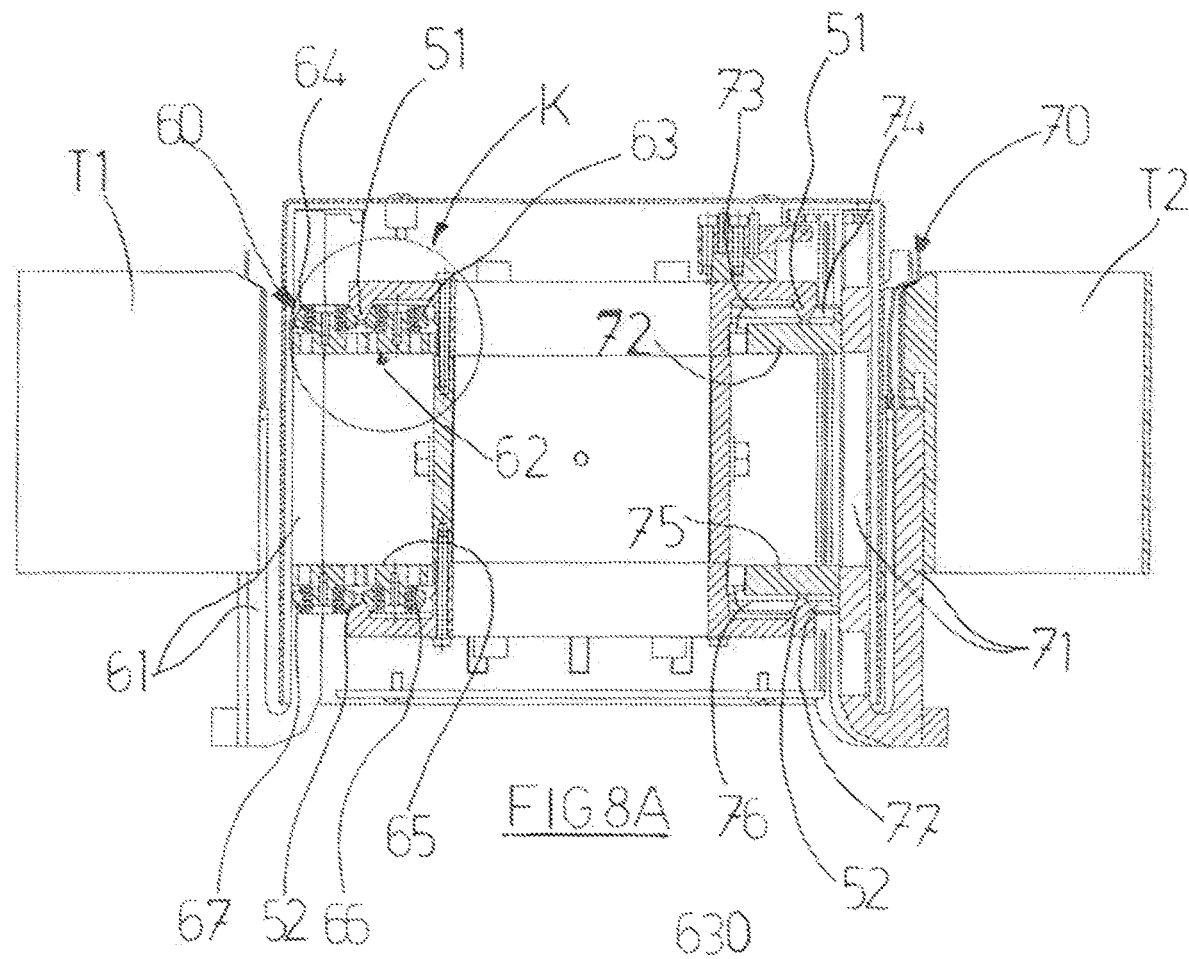
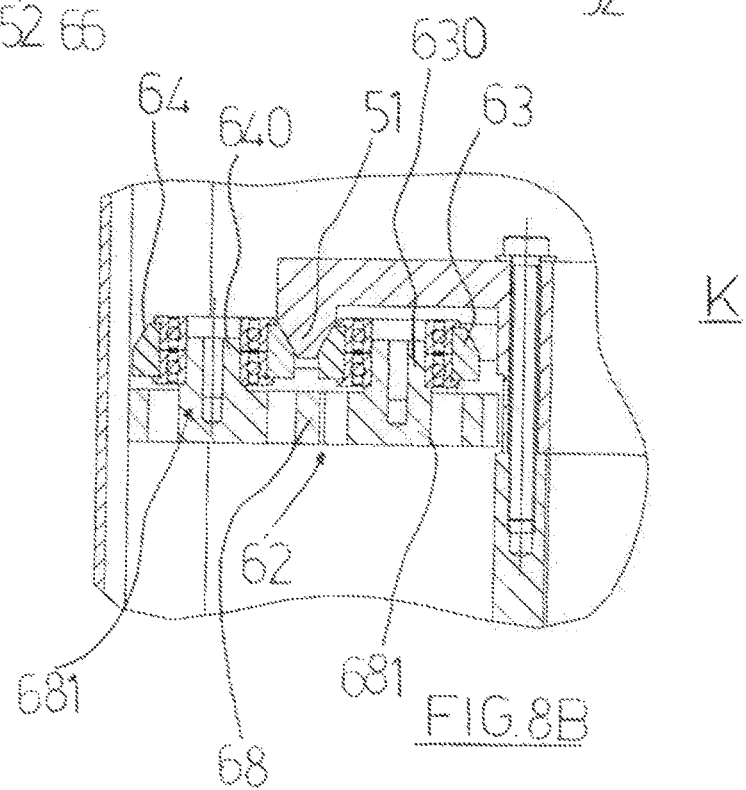

APPARATUS FOR TRANSFER OF PHARMACEUTICAL ARTICLES FROM A COUNTING MACHINE TO INTERNALLY OF CONTINUOUSLY ADVANCING CONTAINERS

TECHNICAL FIELD

The present invention relates to the technical sector relative to the packing of pharmaceutical or para-pharmaceutical articles, such as for example tablets, capsules, pills and the like internally of relative containers, such as for example vials, flask, small bottles etc.

In particular, the present invention relates to an apparatus which is predisposed and suitable for transfer of the pharmaceutical articles, supplied in outlet from a counting machine, internally of containers which are advanced along a conveyor line.

The present invention further relates to a transport device of the container elements (in the following termed tubular elements) suitable for receiving the articles from the counting machine and transferring them internally of the containers which are continuously advancing along the conveyor line.

BACKGROUND ART

In this particular technical sector, there is a known need for carrying out insertion of the articles in relative containers in the exact and predetermined number requested.

Therefore, it is of fundamental importance for the articles inserted in the containers to correspond to the predetermined number.

For this purpose machines are known, by the name of counters, which carry out the count of the articles and provide at the outlet thereof the number of articles in the predetermined number for filling the containers.

As it is not known, nor can be previously, which and how many articles are sent to the counting machine, the time interval that passes between the completion of a count of the exact number of articles requested and the following one is never constant, nor is it possible to predict or calculate it priorly.

Consequently the unloading of the counted articles in the exact number requested by the outlet of the counting machine cannot always occur with the same time frequency and rhythm.

A prior art application for carrying out the insertion of the counted articles from the outlet of the counting machine internally of the relative containers includes causing the containers to transit directly below the outlet of the counting machine and to halt them at the outlet for the time required for filling thereof.

It is clear that a procedure such as the one above is certainly not advantageous in terms of productivity, as the number of containers that can be filled per minute is very low, as each time it is necessary to pause the container below the outlet of the counting machine up to when the articles are unloaded in the exact required number.

The applicant has already obviated the above-mentioned drawbacks by designing and constructing an apparatus able to perform the transfer of the pharmaceutical articles from the outlet of the counting machine internally of containers which are advanced continuously along a conveyor line, therefore without the need to halt them so as to fill them.

This apparatus is described in patent application EP 2 671 807.

The apparatus comprises a first series of tubular elements and a second series of tubular elements, suitable for receiving the articles from the counting machine and for carrying out the transfer of the containers while they are advancing continuously along a conveyor line.

The tubular elements of the first series of tubular elements are borne by relative support arms, which are constrained to a support organ set in rotation about a relative vertical rotation axis, so that the support arms are activated in rotation about this axis and the relative tubular elements can be moved according to a circular pathway so that they can transit both below the outlet of the counting machine and above the containers advancing continuously along the conveyor line.

Correspondingly, the tubular elements of the second series of tubular elements are borne by relative support arms, which are constrained to a support organ set in rotation about a relative vertical rotation axis, so that the support arms are activated in rotation about this axis and the relative tubular elements can be moved according to a circular pathway such that they can transit both below the outlet of the counting machine and above the containers advancing continuously along the conveyor line.

The two support organs are activated independently of one another by means of relative motor organs, and each thereof can be activated in rotation about the rotation axis thereof in both a stepped mode and a continuous mode, for following the containers advancing along the conveyor line.

In this way, the first series of tubular elements and the second series of tubular elements can be activated independently of one another, and the tubular elements of each series can be activated both in stepped mode and, therefore, can be halted time by time below the outlet of the counting machine for receiving the counted articles, and, once filled with the articles in the required number, can be activated in continuous mode so as to follow and be positioned above a container, while it is advancing continuously along the relative conveyor line, and release therein the articles contained internally thereof.

To retain the articles internally of the tubular elements, during the travel thereof between the outlet of the counting machine and the position in which the tubular elements are above the containers, a support plate is provided.

The plate has a curved extension corresponding to the extension of the tubular elements, from the outlet of the counting machine up to a position at the point where the tubular elements are above the containers, and is situated at a level such that the lower ends of the tubular elements are positioned immediately above the plate, so as to be able to slide on the plate so that the articles are maintained internally thereof due to the presence of the plate which occludes the lower end thereof.

The plate also has a tapered edge so that the lower end of the tubular elements is freed and gradually opened in synchrony with the positioning thereof above the containers.

The plate further exhibits holes connectable to an aspiration source so that the inside of the tubular elements, during the sliding thereof above the plate between the outlet of the counting machine and the position in which they are above the containers to be filled, is subjected to an aspirating action with the aim of aspirating and removing any dust present and accumulated between the pharmaceutical articles transported thereby.

An apparatus of this type has without doubt been demonstrated to be efficient, especially in terms of increase in productivity, in the sense that it has been able to guarantee the filling of the containers when they are maintained in continuous advancement along a conveyor line, therefore without the need to have to halt the containers for the filling operations.

The Applicant has however added improvements and details to the above-mentioned apparatus by making a series of improvements that have, enabled obviating some drawbacks which were capable of emerging in certain circumstances that could not be predicted with certainty beforehand.

For example, the Applicant has found that at times the counting machine, as a consequence of irregularities in the supply of the articles to be counted, takes a longer time than usual (or predictable in normal circumstances) for terminating the counting operations and making available, at the outlet thereof, the exact number of articles required for filling the containers.

The occurrence of this circumstance led to the need to maintain one or more of the tubular elements of one of the two series of tubular elements paused for a longer time below the counting machine, while the tubular elements of the other series, once having completed the unloading operations thereof, were forced to back up the first and await their turn.

This was due to the fact that the time passing between receiving the exact number of articles from the counting machine and the unloading of the articles internally of the containers is very rapid, as the trajectory followed by the tubular elements from the outlet of the counting machine to the position in which they are above the containers is substantially circular and therefore of brief entity.

Consequently the drawback might arise that some containers might transit beyond the position fixed for filling thereof without there being tubular elements ready for the release of the articles, as they had to wait for the correct and complete filling thereof below the counting machine.

Further, the time during which the tubular elements are above the containers is very short, as they follow a pathway that is substantially circular while the containers advance continuously along a straight advancement direction, and therefore the release operations of the articles might not be optimal (the superposing portion between the pathway followed by the tubular elements and the pathway followed by the containers is very brief and short).

In this regard, cams are present in the apparatus for correcting the circular trajectory followed by the tubular elements at the superposing position thereof over the pathway of the containers so that the tubular elements follow a straight portion above the containers in order to lengthen the time during which the tubular elements follow the containers for unloading the articles internally thereof.

However this detail has shown itself not to be entirely satisfactory.

Further, since, as indicated in the foregoing, the trajectory the tubular elements follow above the plate between the outlet of the counting machine and the position in which they release the articles into the containers is of a short entity, the dust aspirating operations have not always been observed to be entirely efficient.

DISCLOSURE OF INVENTION

An aim of the present invention is therefore to disclose an improved apparatus for carrying out the transfer of the pharmaceutical articles from a counting machine to inside containers that are advancing continuously along a conveyor line, able to obviate the drawbacks described in the foregoing.

The above-mentioned aim is attained with an apparatus for transfer of pharmaceutical articles into relative containers continuously advancing along a conveyor line according to claim 1.

A further aim of the invention is to provide a transport device of the container elements (i.e. of the tubular elements), suitable for transfer of the articles, which is installed and predisposed in the apparatus with the aim of making the container elements as stable as possible during the transfer pathway of the articles from the counting machine internally of the containers advancing continuously along a conveyor line.

BRIEF DESCRIPTION OF THE DRAWINGS

The above-described aim is obtained in accordance with a transport device according to claim 6.

The characteristics of the apparatus for the transfer of pharmaceutical articles from a counting machine internally of containers continuously advancing along which a conveyor line, and of the transport device of the container elements (tubular elements) carrying out the transfer of the articles, disclosed by the present invention, are now described in the following with reference to the accompanying tables of drawings in which:

FIG. 6 is a schematic perspective view of the apparatus of the invention with some parts having been removed in order better to evidence others, in particular for highlighting the transport device of the tubular elements;

FIG. 7 is a view from above of the view of FIG. 6;

FIG. 8A is a partial view along section line VIII-VIII of FIG. 7, while FIG. 8B is a larger-scale illustration of detail K of FIG. 8A;

Figure 9:
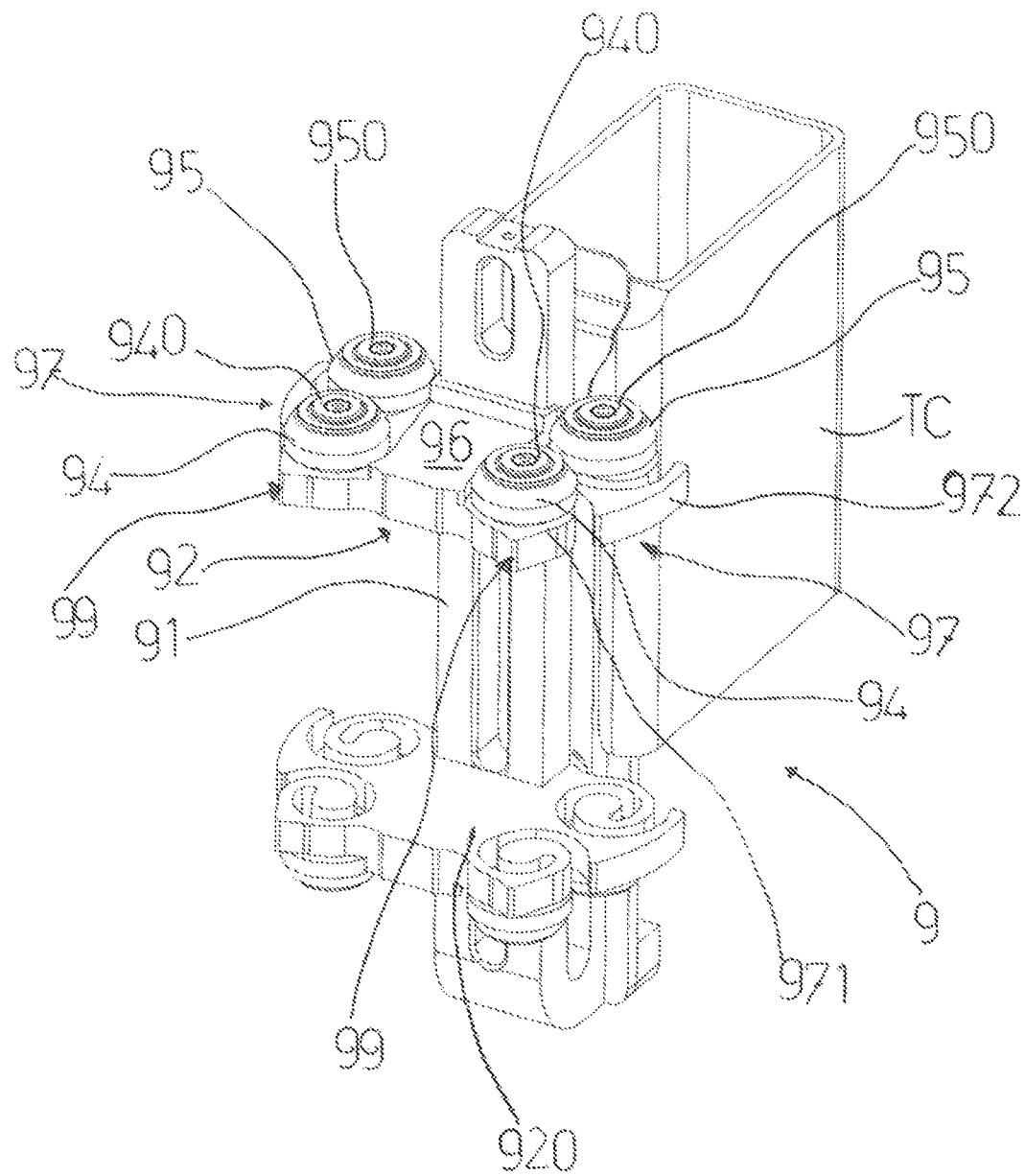
Figure 10:
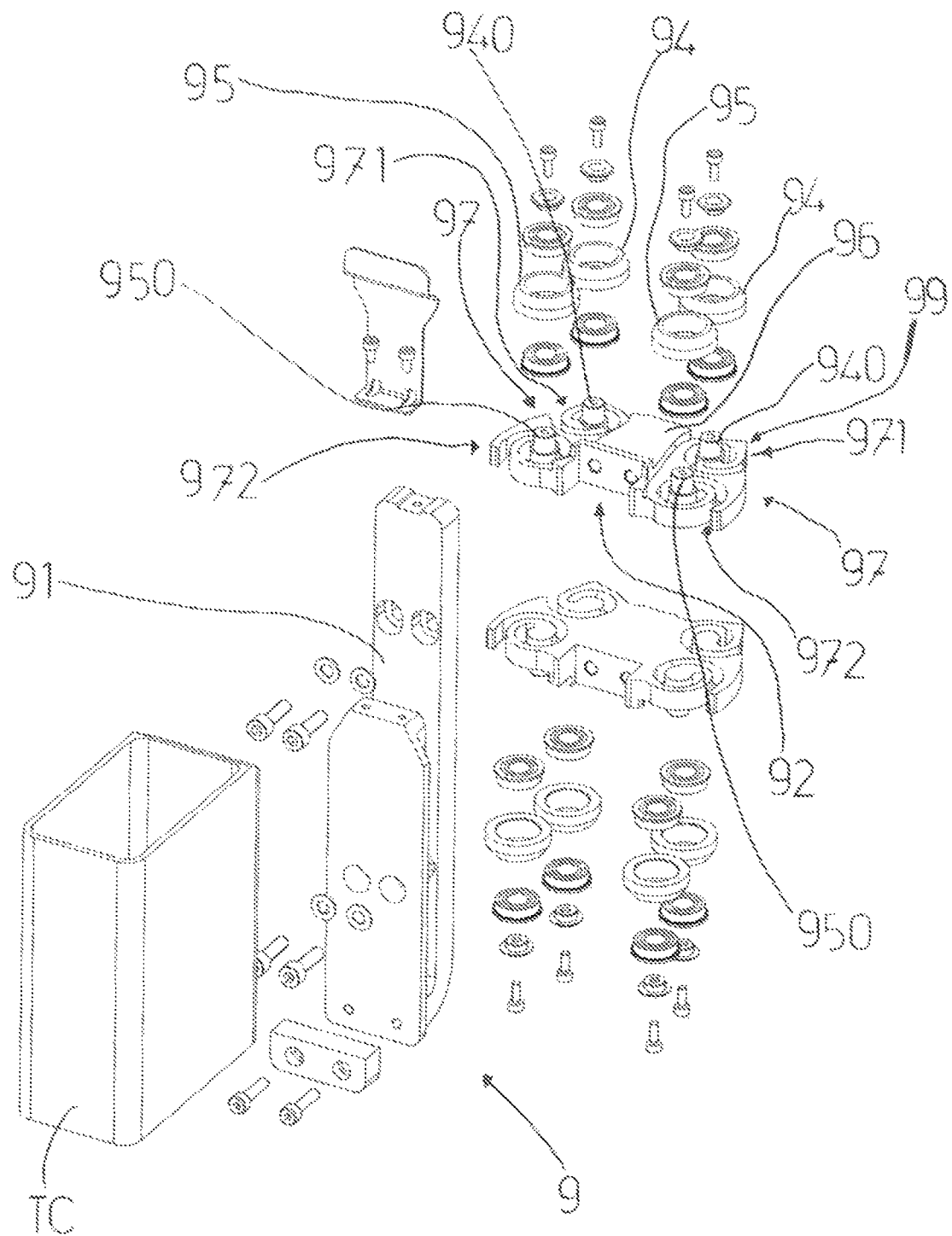

the FIG. 9 is a perspective view of a preferred embodiment of the transport device of the tubular elements which is installed and predisposed in the apparatus;

FIG. 10 illustrates, in an exploded view, the various elements of the transport device illustrated in FIG. 9.

Figure 11A:
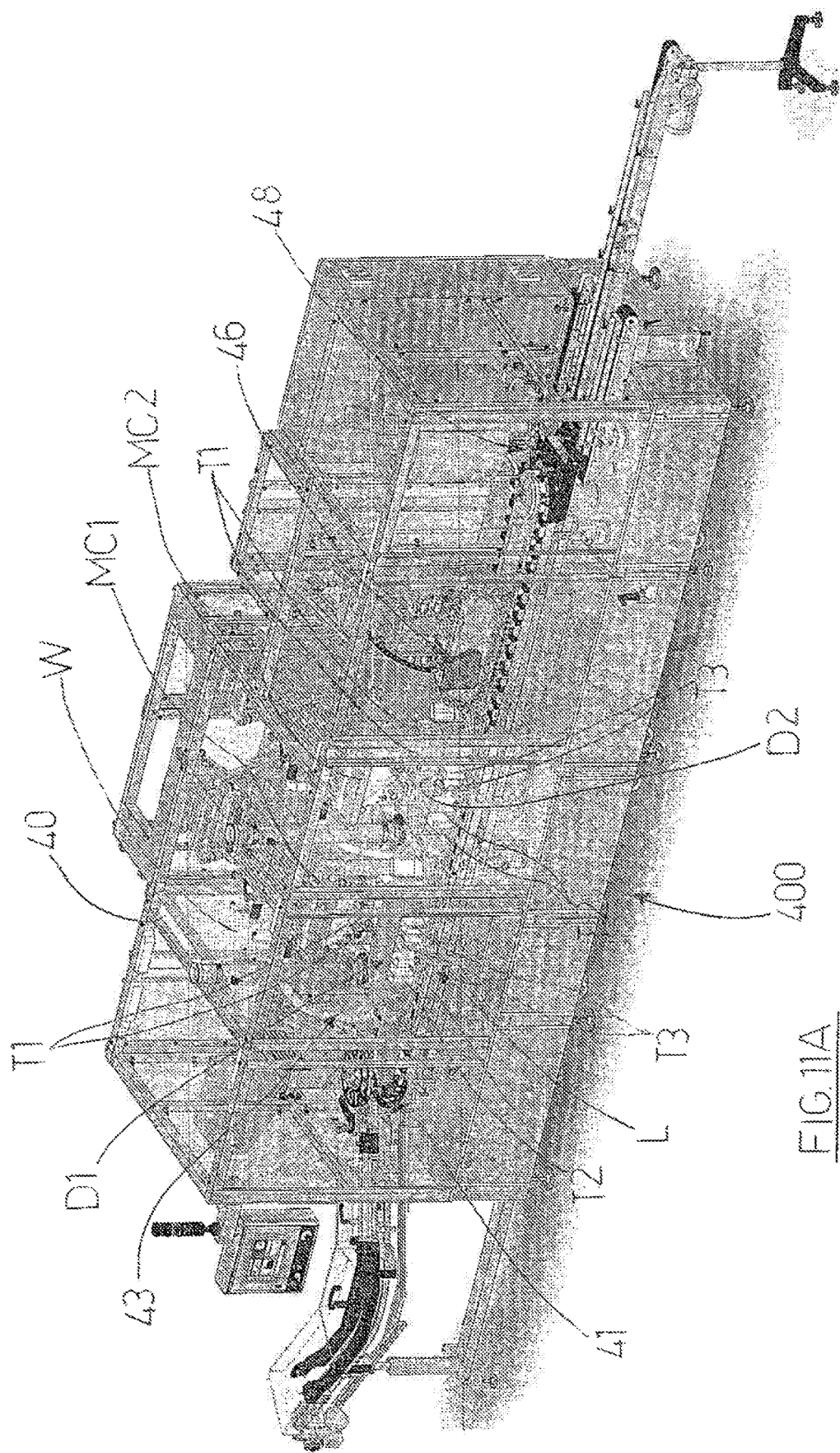
Figure 11B:
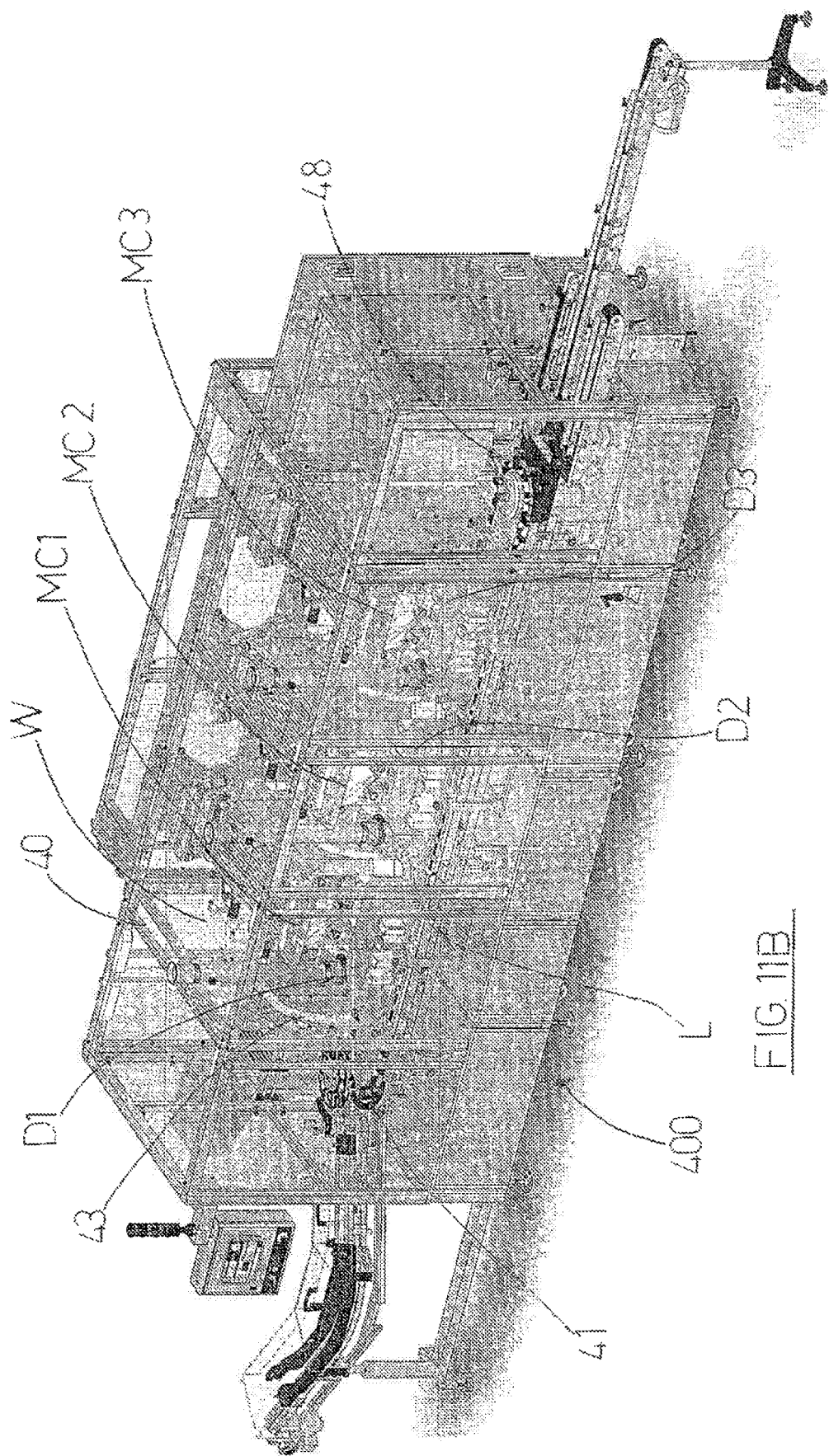

FIGS. 11A and 11B illustrate two possible layouts of packaging machines of pharmaceutical articles internally of relative containers in which the apparatus of the invention can be predisposed according to a possible embodiment.

DESCRIPTION OF PREFERRED EMBODIMENTS

With reference to the accompanying tables of drawings, and in particular figures from 1 to 8A, reference letter (D) denotes the apparatus for the transfer of pharmaceutical articles and at least a counting machine (MC) internally of containers continuously advancing along a conveyor line (L), object of the present invention, in its entirety.

Figure 1:
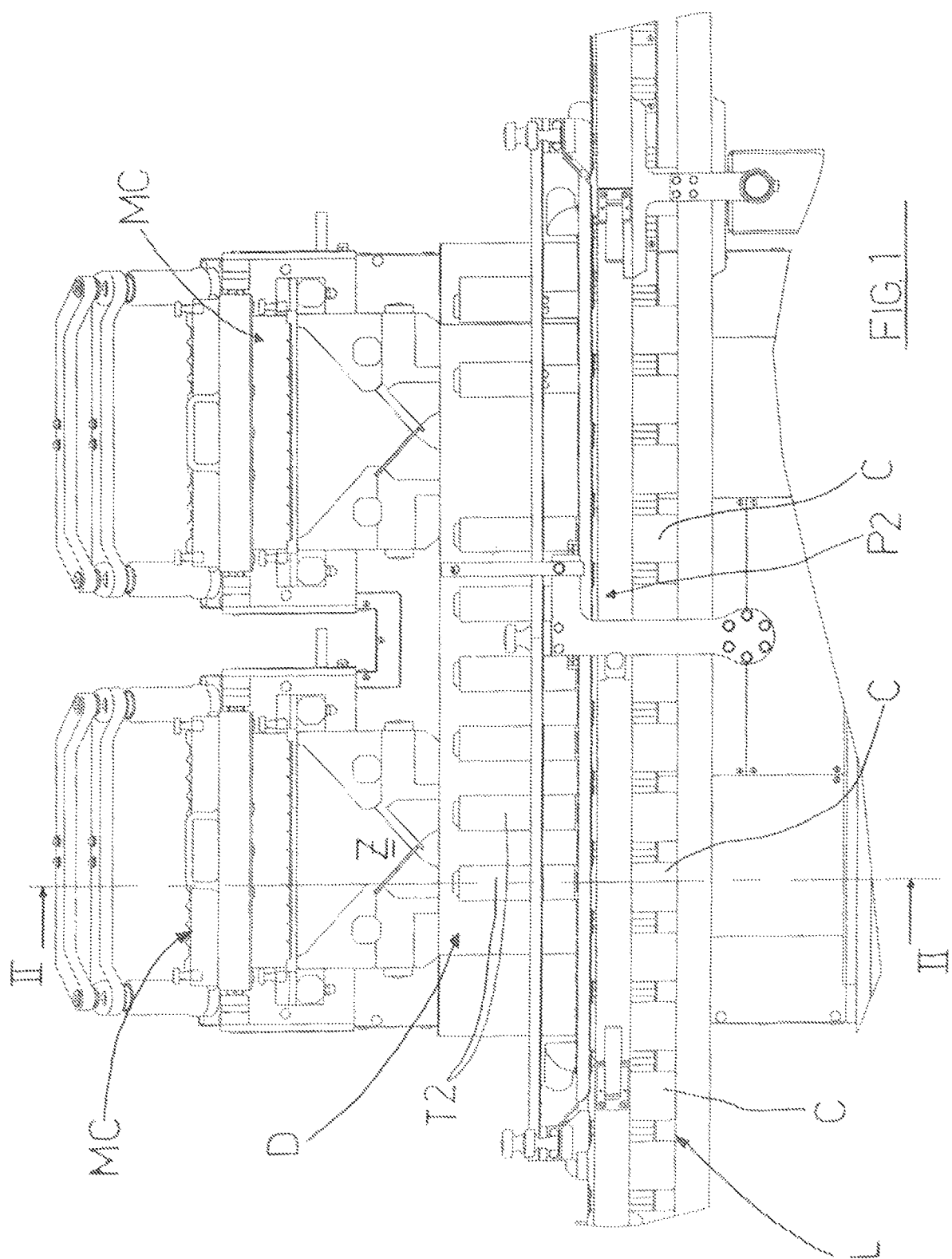
FIG. 1 illustrates, in a lateral schematic view, a preferred embodiment of the apparatus of the present invention located between two counting machines and a conveyor line of the containers to be filled, along which the containers are continuously advanced.

The apparatus (D) of the invention, as it will be described in detail in the following, can be predisposed and therefore used for receiving the articles both from a single counting machine (MC) and even from at least two counting machines (MC) arranged one by a flank of the other, such as for example in the preferred, embodiment illustrated in FIG. 1.

Counting machines (MC), in known ways, have a storage zone (Z) into which the articles are directed, once they have been counted by counting means present in the counting machine (MC) itself.

Figure 2:
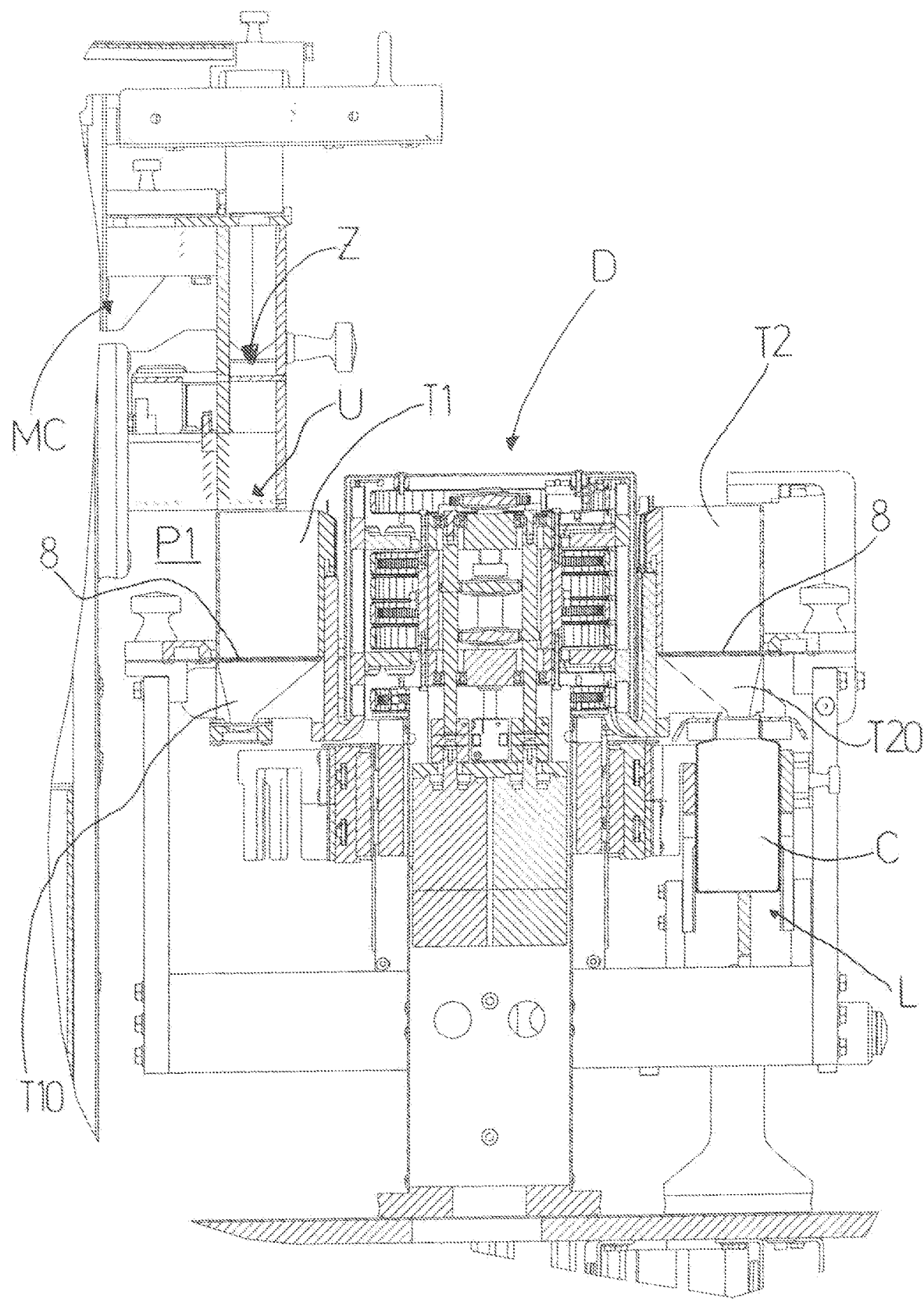
FIG. 2 is a view along the vertical transversal plane II-II of FIG. 1.

The storage zone (Z) is provided with an outlet (U) for the articles, openable for release of the articles in a downwards direction, and which is usually laterally arranged and in a position at a level that is raised with respect to the containers (C) to be filled which advance in continuous mode along the conveyor line (L) (see for example FIG. 2).

The apparatus (D) disclosed by the invention comprises a first series of tubular elements (T1), which have dimensions such as to be able to freely receive the pharmaceutical articles internally thereof, and at least a second series of tubular elements (T2) also having dimensions such as to be able to freely receive the pharmaceutical articles internally thereof.

In the preferred but not exclusive embodiment of the apparatus (D) illustrated in the figures, the first series of tubular elements (T1) and the second series of tubular elements (T2) each comprise two tubular elements: it is possible to have embodiments in which each of the two series of tubular elements (T1, T2) also comprises more than two tubular elements.

Figure 3:
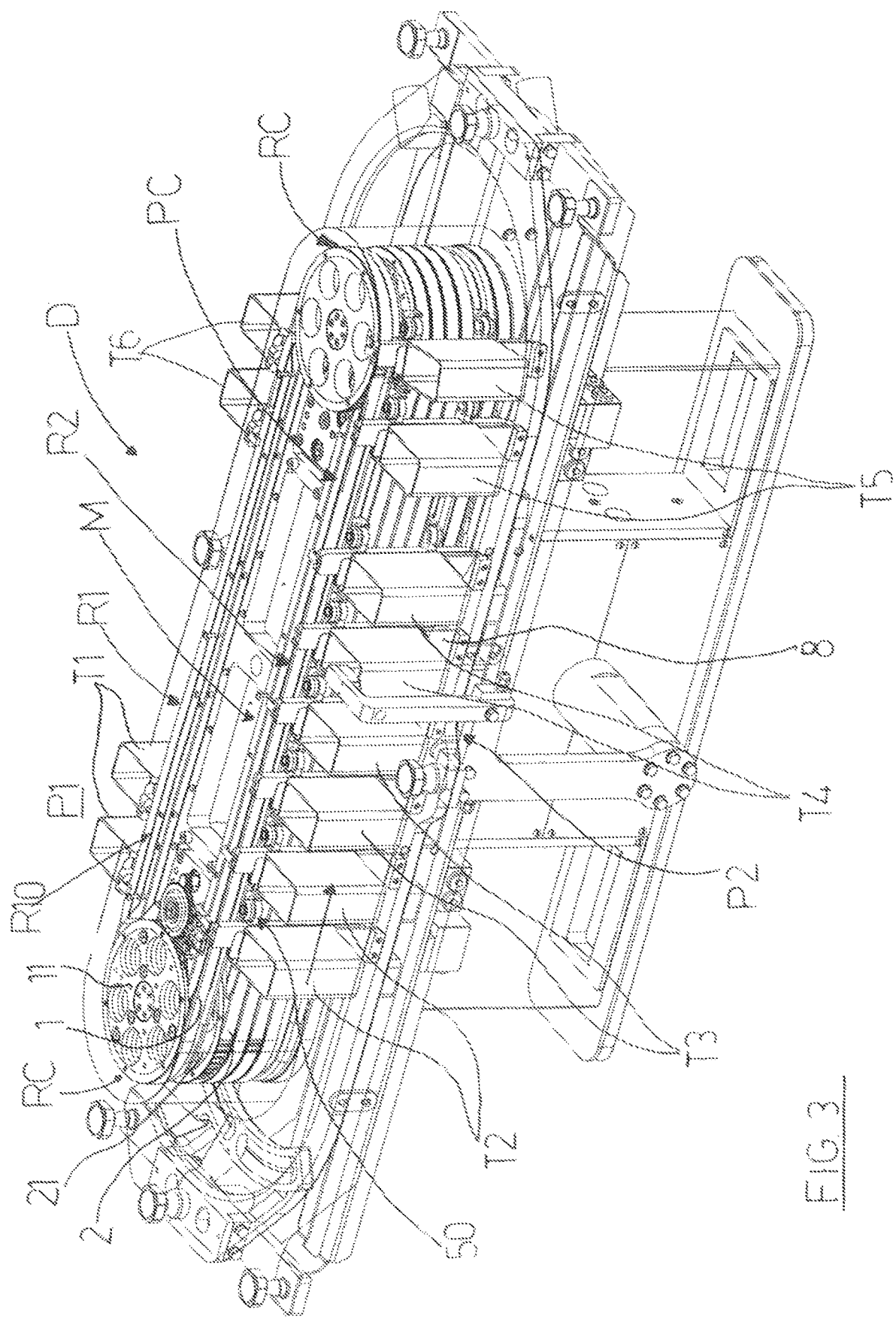
FIG. 3 is a schematic perspective view of the apparatus in its significant parts with other parts having been removed for greater clarity.
Figure 4:
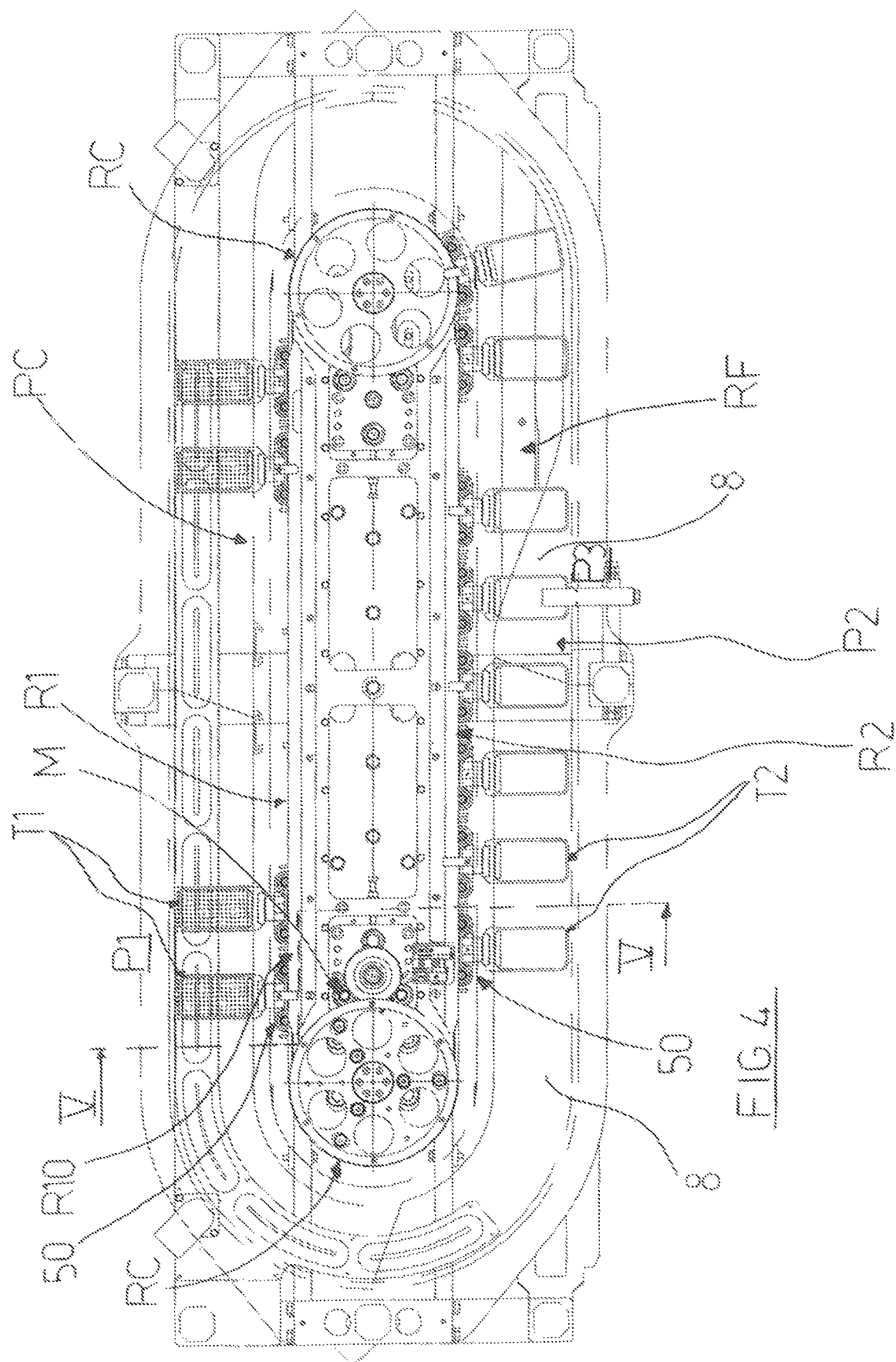
FIG. 4 illustrates, in a schematic view from above, the apparatus illustrated in FIG. 3.

The apparatus (D) is also provided with movement means (M) of the tubular elements (T1) of the first series of tubular elements (T1) and the tubular elements (T2) of the second series of tubular elements (T2), which are predisposed between the at least a counting machine (MC) and the conveyor line (C) of the containers (C) (see for example FIG. 3 and FIG. 4).

The movement means (M) are suitable for moving the first series of tubular elements (T1) and for moving the second series of tubular elements (T2) along a movement pathway such that the tubular elements (T1) of the first series of tubular elements (T1) and the tubular elements (T2) of the second series of tubular elements (T2) transit into a position (P1) below the outlet of the counting machine (MC) and travel along at least a portion (P2) of the movement pathway thereof above the containers (C) advancing in continuous mode along the conveyor line (L).

Further, the movement means (M) of also suitable for moving the first series of tubular elements (T1) and the second series of tubular elements (T2) along the movement pathway, independently of one another and in such a way that the first series of tubular elements (T1) and the second series of tubular elements (T2) can be movable along the movement pathway:

in a stepped movement mode, so that each of the tubular elements (T1) of the first series of tubular elements (T1) and each of the tubular elements (T2) of the second series of tubular elements (T2) can be respectively stopped time by time in the position (P1) below the outlet (U) of the counting machine (MC) for the time necessary for receiving internally thereof the counted articles recognised as valid from the counting machine (MC), which, with a continuous advancing modality so that the tubular elements (T1, T2), once the articles have been received from the counting machine (MC), can travel along at least the portion (P2) above the containers (C), and follow the containers (C), with the same velocity as the containers (C) advancing in continuous mode along the conveyor line (L).

In this way, for example, when the tubular elements (T1) of the first series of tubular elements (T1) halted below the outlet (U) of the counting machine (MC), the tubular elements (T2) of the second series of tubular elements (T2), which had previously already received the articles from counting machine (MC), can be continuously activated so as to follow the portion (P2) above the containers (C) and release the articles therein.

The situation is inverted when it is the tubular elements (T2) of the second series of tubular elements (T2) that are halted below the outlet (U) of the counting machine.

The apparatus (A) further comprises a support plate (8) (see for example FIGS. 2, 4 and 5) arranged so as to be positioned at a level such that the tubular elements (T1, T2) of the first series of tubular elements (T1) and of the second series of tubular elements (T2) can slide on the plate (8), when they are moved by the movement means (M) from the outlet (U) of the counting machine (MC) up to above a container (C) to be filled, so that the articles contained therein are retained internally thereof.

A first peculiarity characterising the apparatus (D) of the invention consists in the fact that the movement means (M) comprise a first looped movement organ (1), for movement of the first series of tubular elements (T1) and at least a second looped movement organ (2) for movement of the at least a second series of tubular elements (T2).

The first looped movement organ (1) and the second looped movement organ (2) are predisposed so as to be one above the other and movable by relative respective motor organs (11, 21) (see for example the FIG. 3 and the FIG. 4).

Both the first looped movement organ (1) and the second looped movement organ (2) have a shape such as each to define a looped movement pathway (PC) for the tubular elements (T1, T2) comprising a first straight movement portion (R1) of the tubular elements (T1, T2) and a second straight movement portion (R2) of the tubular elements (T1, T2) connected to one another by relative curved portions (RC).

In particular, the first movement organ (1) and the second movement organ (2) are arranged such that:

the first straight movement portion (R1) of the tubular elements (T1, T2) exhibits a part (R10) passing at the position (P1) below the outlet (U) of the counting machine (MC), such that the tubular elements (T1) of the first series of tubular elements (T1) and the tubular elements (T2) of the second series of tubular elements (T2) can be stopped time by time in the position (P1) below the outlet of the counting machine (MC) for the time necessary for receiving internally thereof the counted articles from the counting machine (MC), in that the second straight movement portion (R2) of the tubular elements (T1, T2) is located at the portion (P2) above, and follows an extension, of the conveyor line (L) of the containers (C), so that the tubular elements (T1, T2) can be moved above the containers (C) and follow the containers with a same advancement velocity thereof along all the second straight movement portion (R2).

In this regard, the support plate (8) has a development and extension such as always to be arranged below the tubular elements (T1, T2) when they are moved along the looped movement pathway (PC) thereof, at least starting from the part (R10) of the first straight movement portion (R1) situated in the position (P1) below the outlet (U) of the counting machine (MC), so as to enable unloading of the counted articles into the tubular elements (T1, T2) when they are stopped below the outlet (U), up to at least a position (P3) situated upstream of and in proximity of a final portion (RF) of the second straight movement portion (R2) (see FIG. 4).

In this way, when the tubular elements (R1, T2) with the articles internally thereof, are moved along the second straight movement portion (R2) with the same velocity as and above the containers (C) which advance in continuous mode along the conveyor line (L), pass beyond the plate (8) and are directly above the mouth of the containers (C) for the release therein of the articles only when they reach and advance along the final portion (RF) of the second straight movement portion (R2) (see FIG. 4 once more).

A further peculiarity of the apparatus (D) that is the object of the invention consists in the fact that it comprises guide and transport means (50) of the first series of tubular elements (T1) and of the second series of tubular elements (T2) provided and predisposed to transport and guide the tubular elements (T1) of the first series of tubular elements (T1) and the tubular elements (T2) of the second series of tubular elements (R2) along the looped movement pathway (PC), such that the tubular elements (T1, T2) are maintained arranged vertically and with the lower end thereof at a same predetermined distance from the support plate (8) so as to retain the articles internally thereof during movement of the tubular elements (T1, T2) on the plate (8).

The fact of being able to arrange the movement means (M) comprising a first movement organ (1), for the first series of tubular elements (T1), and a second movement organ (2), for the second series of tubular elements (T2), which are arranged and predisposed so as to move the tubular elements (T1) of the first series of tubular elements (T1) and the tubular elements (T2) of the second series of tubular elements (T2) along a looped pathway (PC), comprising a first straight portion (R1) and a second straight portion (R2), enables transiting and halting the tubular elements (T1, T2) below the outlet (U) of the counting machine (MC) in a position along a part (R10) of the first straight portion (R1), and advancing the tubular elements (T1, T2) directly above the mouth of the containers (C), once having passed beyond the end of the plate (8), only at the final portion (RF) of the second straight portion (RF) of the second straight portion (R2), after having travelled along a portion of the loop-wound movement pathway (PC) thereof above the support plate (8).

With respect to apparatus of known type and cited in the preamble (the prior art of EP 2 671 807), so that there is the possibility for the tubular elements (T1, T2) of one of the two series of tubular elements halted below the outlet (U) of the counting machine (MC) can stay stationary for a longer time, while awaiting the completion of the counting operations, since the tubular elements (T1, T2) of the other series, already previously filled with the articles supplied in outlet by the counting machine, have available a longer pathway for reaching the position at which they are directly above the mouth of the containers to be filled (in practice the portion of the looped pathway between the part (R10) of the first straight portion (R1) below the outlet of the counting machine up to the final portion (RF) of the second straight portion (R2), see for example FIG. 4).

Further, since the second straight portion (R2) of the looped pathway (PC) is located above and at the conveyor line (L), along which the containers are advanced continuously, enables moving the tubular elements (T1, T2) in a same direction as the advancement of the containers, by optimising the unloading of the articles in the containers once the tubular elements (T1, T2) pass beyond the end of the support plate (8).

The support plate (8) is further provided, such as for example is visible in some larger-scale details of FIG. 4, with through-holes connected to an aspiration source.

The dust removal operations therefore are more effective with respect to the prior art apparatus cited in the preamble since the tubular elements can travel along a very long portion above the plate, once the articles have been received from the counting machine.

Lastly, owing to the presence of the guide and transport means (50), the apparatus (D) of the invention enables making and maintaining the tubular elements (T1, T2) arranged stably vertical and with the lower end thereof always at a given distance from the support plate during movement thereof along the looped movement pathway (PC), from the position (P1) below the outlet of the counting machine up to the final portion (RF) of the second straight portion (R2).

The cited guide and transport means (50) comprise (see for example FIGS. 4, 5, 6, 7):

at least a looped guide rail (51, 52);

for each tubular element (T1) of the first series of tubular elements (T1): a transport device (60) predisposed for connecting the tubular element (T1) to the first movement organ (1) and for following the guide rail (51, 52), for each tubular element (T2) of the second series of tubular elements (T2): a transport device (70) predisposed for connecting the tubular element (T2) of the second series of tubular elements (T2) to the second movement organ (2) and for following the guide rail (51, 52).

In particular, the at least a looped guide rail (51, 52) exhibits a pathway and an extension having two straight portions connected to one another between two curved portions (see for example FIG. 7) and such that:

when the first movement organ (1) is actuated by the relative motor organ (11) for moving the tubular elements (T1) of the first series of tubular elements (T1), the transport device (60) associated thereto runs on the looped guide rail (51, 52), consequently forcing the tubular elements (T1) to follow the looped movement pathway (PC) while maintaining them stable in a vertical position so that when the tubular elements (T1), once the articles have been received from the outlet (U) of the counting machine (MC), slide on the support plate (8), the lower end thereof is always at the predetermined distance from the plate (8);

when the second movement organ (2) is actuated by the relative motor organ (21) for moving the tubular elements (T2) of the second series of tubular elements (T2), the transport device (70) associated thereto runs on the looped guide rail (51, 52), consequently forcing the tubular elements (T2) to follow the looped movement pathway (PC) while maintaining them stable in a vertical position so that when the tubular elements (T2), once the articles have been received from the outlet (U) of the counting machine (MC), slide on the support plate (8), the lower end thereof is always at the predetermined distance from the plate.

In particular, the transport device (60) of each tubular element (T1) of the first series of tubular elements (T1) comprises (see for example FIGS. 5, 6, 7, 8A, 8B): a support element (61) fixed to the tubular element (T1) and constrained to the first movement organ (1), at least a carriage (62, 65) fixed to the support element (61) and provided with a pair of internal wheels (63, 66) and a pair of external wheels (64, 67).

The pair of internal wheels (63, 66) and the pair of external wheels (64, 67) are predisposed on the at least a carriage (62, 65) in such a way that when the support element (61) is constrained to the first movement organ (1), the pair of internal wheels (63, 66) and the pair of external wheels (64, 67) engage the at least a guide rail (51, 52) on opposite sides thereof, ensuring greater stability and a guide for the carriage (62, 65), and consequently for the tubular elements (T1) fixed thereto.

Correspondingly, the transport device (70) of each tubular element (T2) of the second series of tubular elements (T2) comprises: a support element (71) fixed to the tubular element (T2) and constrained to the second movement organ (2), at least a carriage (72,75) fixed to the support element (71) and provided with a pair of internal wheels (73, 76) and a pair of external wheels (74, 77)

The pair of internal wheels (73, 76) and the pair of external wheels (74, 77) are predisposed on the at least a carriage (72.75) in such a way that when the support element (71) is constrained to the second movement organ (2), the pair of internal wheels (73, 76) and the pair of external wheels (74, 77) engage the at least a guide rail (51, 52) on opposite sides thereof.

The pair of internal wheels (63, 66), predisposed on the at least a carriage (62, 65) of the transport device (60) of each of the tubular elements (T1) of the first series of tubular elements (T1), are advantageously rotatably mounted on relative pins (630) which are predisposed on the at least a carriage (62, 65) by means of an elastic coupling so that the position of the relative axes can be elastically yielding In this way the interaxis between the pins (630) and therefore between the internal wheels (63, 66) can vary in consequence of a different stress to which the pairs of internal wheels (63, 66) can be subjected during running thereof and passage from a straight portion to a curved portion of the at least a guide rail (51, 52), In the same way, also the pair of external wheels (64, 67), predisposed on the at least a carriage (62, 65) of the transport device (60) are rotatably mounted on relative pins (640) which are also predisposed on the at least a carriage (62, 65) by an elastic coupling in such a way that the position of the relative axes can be elastically yielding so that the interaxis between the pins (640) and therefore between the external wheels (64, 67) can vary in consequence of a different stress to which the pairs of external wheels (64, 67) can be subjected during running thereof and passage from a straight portion to a curved portion of the at least a guide rail (51, 52).

With this peculiarity, when the carriage (62, 64) is to pass from a straight portion to a curved portion of the guide rail (51, 52), and the internal and external wheels are to change the sliding trajectory thereof along the guide rail (51, 52), the pins on which the wheels are mounted can elastically vary the position thereof, to adapt to the direction change of the guide rail, thus preventing an onset of any deviating of the carriage which might compromise the stability and position of the tubular elements above the plate, preventing any undesired skidding of the lower end thereof against the plate or a distancing thereof from the plate that might cause some articles contained therein to be ejected.

Correspondingly, these peculiarities are also present for the transport device (70) of the tubular elements (T2) of the second series of tubular elements (T2).

The pair of internal wheels (73, 76), predisposed on the carriage (72, 75) of the transport device (70) are rotatably mounted on relative pins (730) which are predisposed on the at least a carriage (72, 75) by an elastic coupling in such a way that the position of the relative axes can be elastically yielding so that the interaxis between the pins (730) and therefore between the internal wheels (73, 76) can vary in consequence of a different stress to which the pairs of internal wheels (73, 76) can be subjected during running thereof and passage from a straight portion to a curved portion of the at least a guide rail (51, 52).

In the same way, also the pair of external wheels (74, 77), predisposed on the at least a carriage (72, 75) of the transport device (70) are rotatably mounted on relative pins (740) which are also predisposed on the at least a carriage (72, 75) by an elastic coupling in such a way that the position of the relative axes can be elastically yielding so that the interaxis between the pins (740) and therefore between the external wheels (74, 77) can vary in consequence of a different stress to which the pairs of external wheels (74, 77) can be subjected during running thereof and passage from a straight portion to a curved portion of the at least a guide rail (51, 52).

In greater detail, such as is visible for example in FIG. 7, the at least a carriage (62, 65) of the transport device (60) of each of the tubular elements (T1) of the first series of tubular elements (T1) comprises a central support part (68), for fixing to the support element (61) of the transport device (60), and two lateral parts (681), opposite the central part (68).

Each of the two lateral parts (681) comprises an internal region made of an elastically yielding material and an external region made of an elastically yielding material: the pins (630, 640), on which the wheels of the pair of internal wheels (63, 66) and the pair of external wheels (64, 67) are rotatably mounted, are predisposed and mounted on said elastically yielding internal and external regions.

Correspondingly, the at least a carriage (72, 75) of the transport device (70) of each of the tubular elements (T2) of the second series of tubular elements (T2) comprises a central support part (78), for fixing to the support element (71) of the transport device (70), and two lateral parts (781), opposite the central part (78).

Each of the two lateral parts (781) comprises an internal region made of an elastically yielding material and an external region made of an elastically yielding material, with the pins (730, 740), on which the wheels of the pair of internal wheels (73, 76) and the pair of external wheels (74, 77) are rotatably mounted, being predisposed and mounted on said elastically yielding internal and external regions.

With the aim of ensuring a greater stability of the carriages during sliding thereof along the guide rail, the apparatus of the invention has the following further advantageous aspects.

Each of the internal regions of the two lateral parts (681) of the carriage (62, 65) of the transport device (60) of each of the tubular elements (T1) of the first series of tubular elements (T1) exhibits a projecting edge (69) made of an elastic material, for abutting and sliding against a wall (520) associated to the guide rail (51, 52) and arranged by a flank of and along the pathway of the guide rail (51, 52), with the aim of further stabilize the position of the carriage (62, 65), and therefore the tubular elements (T1), during the sliding thereof along the guide rail (51, 52) (see for example FIG. 7).

Likewise, each of the internal regions of the two lateral parts (781) of the carriage (72, 75) of the transport device (70) of each of the tubular elements (T2) of the second series of tubular elements (T2) has a projecting edge (79) made of an elastic material, for abutting and sliding against the wall (520) associated to the guide rail (51, 52) and arranged by a flank and along the pathway of the guide rail (51, 52), with the aim of further stabilize the position of the carriage (72, 75) and therefore of the tubular elements (T2) during running thereof along the guide rail (51, 52).

The guide rail (51, 52) has a profile, in transversal section, that is trapezoidal and in particular an isosceles trapeze shape, while the wheels of the carriages of the transport device of the tubular elements of the first and second series of tubular elements in turn have a complementary shape, for example truncoconical, so as to engage with and run on the oblique sides of the trapeze (guide rail) (see for example FIGS. 8A and 8B).

Each tubular element (T1) of the first series of tubular elements (T1) and each tubular element (T2) of the second series of tubular elements (T2) exhibits a tubular shape, in a cylindrical shape or in a polygonal shape, in particular square or rectangular, with a transversal section of greater dimensions than an opening of a mouth of the containers (C).

Figure 5:
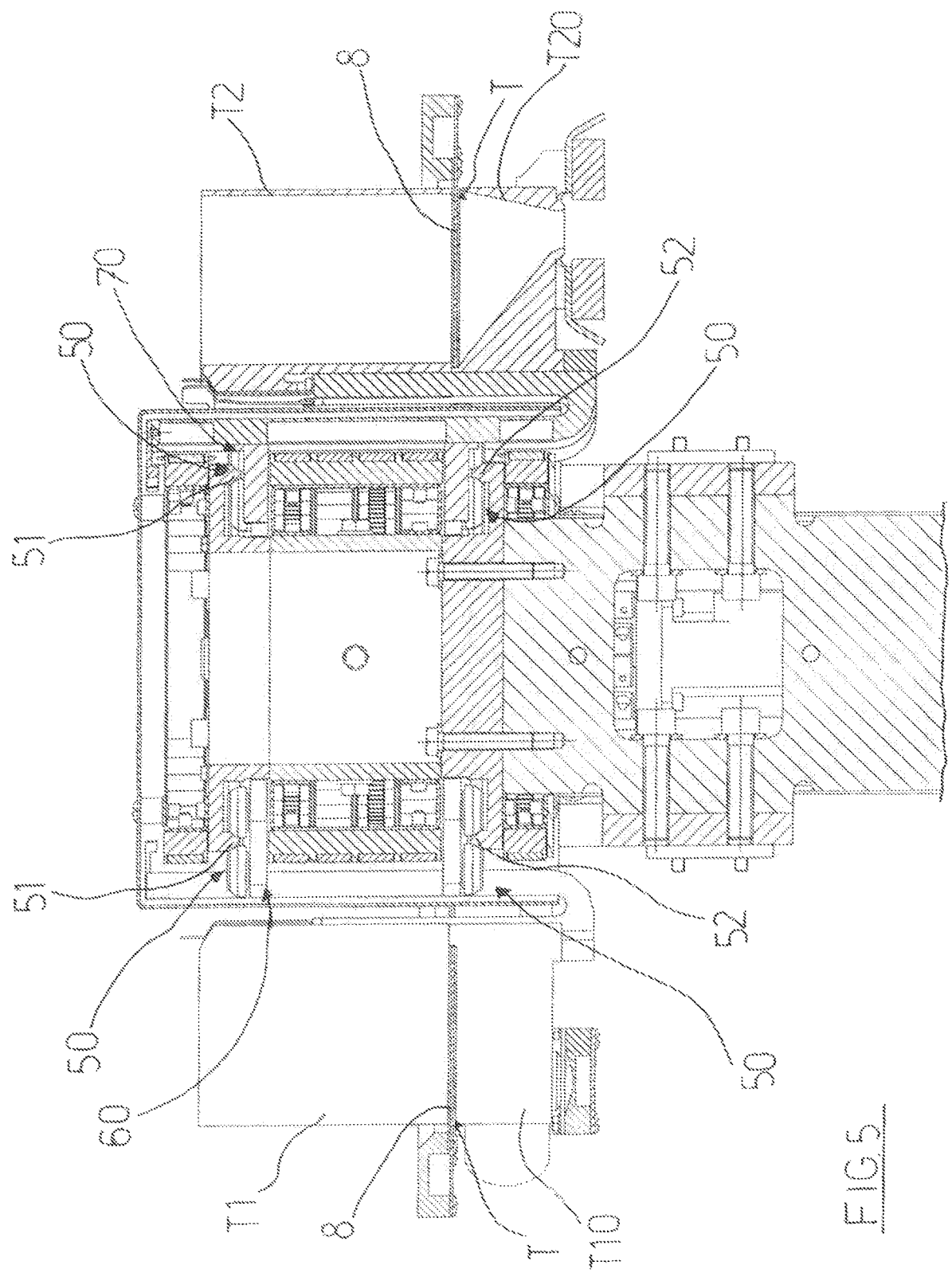
FIG. 5 is a partial view along section line V-V of FIG. 4, illustrating some details of the transport device.

With the aim of facilitating the unloading of the articles internally of the containers advancing continuously along the conveyor line (L), the apparatus (D) comprises, for each tubular element (T1) of the first series of tubular elements (T1) and for each tubular element (T2) of the second series of tubular elements (T2), a respective article unloading element (T10, T20) which is borne by the same support element (61,71) to which the tubular element (T1, T2) is fixed in a lower position and coaxial to the relative tubular element (T, T2) so that one is superposed on the other and so that an opening (T) is present between them which has dimensions of at least equal to the thickness of the support plate (8) (see for example FIGS. 2 and 5).

In this regard, the support plate (8) is predisposed and mounted so as to be positioned at a height that is such that it is interposed to occupy the opening (T) between the tubular element (T1, T2) and the relative underlying article unloading element (T10, T20) when the tubular element (T1, T2) performs the looped movement pathway (PC) thereof from the position (P1) below the outlet (U) of the counting machine (MC) up to the position (P3) of the beginning of the final portion (RF) of the second straight movement portion (R2), so that the articles received by the tubular element (T1, T2) are held resting on the plate (8) during the movement thereof up to the start of the final portion (RF) of the second straight movement portion (R2).

Further, each article unloading element (T10, T20) is internally hollow and provided with an inlet opening, in the relative upper end, having a transversal section at least equal to the transversal section of the relative overlying tubular element (T1, T2) and an outlet opening, in the relative lower end, having a circular transversal section and a diameter corresponding to the diameter of the mouth of the containers (C).

Each article unloading element (T10, T20) is further conformed such that the relative internal walls have a shape and an extension converging towards the outlet opening so that the relative internal volume decreases from the upper end to the lower end, in a funnel shape, for facilitating the unloading of the articles inside the containers without the articles agglomerating internally of the unloading element.

The apparatus (D) disclosed by the invention, in the illustrated preferred embodiment in the accompanying claims, has guide and transport means (50) such as to comprise two guide rails (51, 52), in particular an upper guide rail (51) and a lower guide rail (52) (FIG. 6).

In this way, the transport device (60) of each tubular element (T1) of the first series of tubular elements (T1) comprises an upper carriage (62) and a lower carriage (65), both fixed to the support element (61) of the transport device (60).

The upper carriage (62) is provided with a pair of internal wheels (63) and a pair of external wheels (64) which are predisposed so as to engage the upper guide rail (51) on opposite sides and to slide along it.

The lower carriage (65) is in turn provided with a pair of internal wheels (66) and a pair of external wheels (67) which are predisposed so as to engage the lower guide rail (52) on opposite sides and to slide along it. In this way a greater stability and balancing of the tubular elements (T1) is guaranteed during the movement thereof along the various portions, straight and curved, of the looped movement pathway (PC) thereof, especially when they transport the articles from the counting machine (MC) up to the position thereof above the containers (C).

In an entirely alike way, the transport device (70) of each tubular element (T2) of the second series of tubular elements (T2) comprises an upper carriage (72) and a lower carriage (75), both fixed to the support element (71) of the transport device (70).

The upper carriage (72) is provided with a pair of internal wheels (73) and a pair of external wheels (74) which are predisposed so as to engage the upper guide rail (51) on opposite sides and to slide along it (see FIG. 8A).

The lower carriage (75) is in turn provided with a pair of internal wheels (76) and a pair of external wheels (77) which are predisposed so as to engage the lower guide rail (52) on opposite sides and to slide along it. In this way a greater stability and balancing (C) is guaranteed for the tubular elements (T2), during movement thereof along the various portions, straight and curved, of the looped movement pathway (PC) thereof.

The above-mentioned first looped movement organ (1) and second looped movement organ (2), in the preferred embodiment of the invention illustrated in the accompanying figures, are constituted by belts wound about respective pulleys (visible for example in FIG. 3).

The apparatus (D), such as for example in the preferred embodiment illustrated in the figures, can also comprise further series of tubular elements, each of which comprising two tubular elements, for example a third (T3), a fourth (T4), a fifth (T5), a sixth (T6) series of tubular elements, each of which is moved by a relative looped movement organ which is a part of the movement means (M) for moving the relative tubular elements along the looped movement pathway (PC).

In the illustrated embodiment, therefore, the apparatus will comprise six looped movement organs, for example six belts loop-wound on relative motor organs, and arranged one above another, each of which is for movement of two tubular elements.

In this case the guide and transport means (50) will be associated to the tubular elements of all the series of tubular elements for guiding each of the tubular elements along the first looped movement pathway (PC) so that they are maintained arranged vertically and with the lower end thereof at a same predetermined distance from the support plate (8).

In the illustrated preferred embodiment, the apparatus, as specified in the foregoing, comprises two tubular elements for each of the series of tubular elements (in the illustrated case six series of two tubular elements).

This can be advantageous in a case in which the counting machines have two outlets for the articles, so that the two tubular elements can each be contemporaneously halted below a respective outlet.

In a case in which, on the other hand, the counting machines have only one outlet for the counted articles, the two tubular elements of each series of tubular elements will be halted singly, one after another, below the outlet.

In the preferred embodiment illustrated in figures from 1 to 8A, the looped movement organs (i.e. the six loop-wound belts) of the six series of tubular elements (each of which having two tubular elements) are predisposed and configured so as each to have a first straight portion (R1) having a length such that it is located and transits at two distinct counting machines (MC) arranged one by a flank of the other.

In this case, two series of tubular elements can be halted at the outlets of the two counting machines (for example series (T1) and series (T6) as in FIG. 3) for receiving therefrom the counted articles while the remaining other four series of tubular elements (for example series (T2, T3, T4 and T5), again with reference to FIG. 3) which previously had received the counted articles from two counting machines, can be continuously moved along the second straight movement portion (R2) above the containers (C), for releasing the articles therein when the relative tubular elements reach the final portion (RF) of the second straight portion (R2) and have passed beyond the plate (8).

In FIGS. 11A and 11B, however, a further possible embodiment of the apparatus of the invention is illustrated, which, in this case, comprises at least three series of tubular elements, each of which is constituted by two tubular elements, which are moved by a relative looped belt (therefore at least three looped belts, each belt for the movement of each series of tubular elements constituted by two tubular elements).

The looped belts are predisposed and configured so that the two straight portions of the looped pathway have a shorter length than the preceding case, so that the first straight portion is of a length such as to be able to transit below a single counting machine.

The overall structure of the transfer apparatus of the articles in this case is slimmed-down and also versatile, as in accordance with operating needs or the space available internal of the facility, two more apparatus can be arranged flanked to one another so as to serve two or more counting machines.

For example, FIG. 11A illustrates a possible configuration of the layout of a machine (400) for packing pharmaceutical articles internally of relative containers.

The machine (400) comprises a structure (40) that internally defines a single working environment (W) in aseptic conditions.

Two counting machines (MC1, MC2) are predisposed internally of this working environment (W), and there is a conveyor line (L) for continuously advancing containers to be filled.

Two article transfer apparatus (D1, D2) are present and arranged between two counting machines (MC1, MC2) and the conveyor line (L) in the above-described embodiment of the invention, each of which has at least three series (T1, T2, T3) of tubular elements, each series being provided with two tubular elements. Each of the two apparatus (D1, D2) will therefore be provided with at least three looped movement organs, i.e. three looped belts, for movement of the three series of tubular elements.

The machine (400) also has loading means (41) of the containers, located at a first end of the structure (40) for receiving the containers from outside and loading them on the conveyor line (L).

Upstream of the first apparatus (D1), the machine (400) can also be provided with a device (43) for inserting an anti-moisture element (for example silica gel in sachets or the like) internally of the containers before transfer thereof onto the conveyor line (L), which is suitable for inserted a respective anti-moisture element in the empty containers.

Downstream of the second apparatus (D2) for transfer of articles a device (46) is included for inserting a tuft of cotton wool internally of the containers, which is predisposed for cutting a cotton wool tuft from a ball of cotton wool and inserting it in the containers previously filled with the pharmaceutical articles.

The presence of the cotton wool can be useful for maintaining the pharmaceutical articles more firmly internally of the containers and help to prevent impacts between the articles.

A device (48) is provided downstream of this inserting device (46) of the cotton wool tuft, for closing the containers (C), which is situated in proximity of the second end of the structure (40) and which is suitable for receiving the filled containers one after another from the conveyor line (L), capping them and transferring them once closed by a relative cap towards an outlet conveyor of the capped containers from the structure (40).

The machine (400) therefore has a single structure (40) and a single working environment (W) and is suitable for receiving, from outside, at a first end of the structure (40), empty containers and provide in outlet from the second end of the structure (40), containers filled with the exact number of requested articles and already closed.

The machine (400) therefore enables carrying out the packing of the pharmaceutical articles in relative containers with a single compact and single-block structure.

With this configuration, and thanks to the presence of two apparatus (D1, D2) for transfer of the articles, arranged one following another, which enable transferring the counted articles from the two counting machines (MC1, MC2) internally of the containers in continuous mode along the conveyor line (L), the packing machine (400) is able to ensure high productivity.

The two apparatus (D1, D2) for transferring articles will for example be activated in coordination with one another so as to alternate in transferring the articles received from the two counters internally of the containers which are advancing in continuous mode along the conveyor line (L), for example the first apparatus will transfer the relative articles in the odd-number containers while the second apparatus will transfer the relative articles in the even-number containers, or vice versa.

For example, FIG. 11B illustrates a possible configuration of the layout of a machine (400) for packing pharmaceutical articles internally of relative containers advancing continuously along a conveyor line (L).

In this case the machine (400) is provided internally of the working environment (W) with three counting machines (MC1, MC2, MC3) and consequently also with three distinct apparatus (D1, D2, D3) for transfer of articles according to the invention, in the particular embodiment comprising at least three series (T1, T2, T3) of tubular elements, for example four series of tubular elements, arranged between the three counting machines and the conveyor line (L).

The machine (400) is also provided with the loading device (41) of the containers on the conveyor line (L) of the device (43) for inserting the anti-moisture element and the capping device (48)

In this case, in order to maintain the same length of the machine of FIG. 11A, the cotton wool tuft inserting device is not present downstream of the third article transfer apparatus (D3).

By using article transfer apparatus according to the invention, having a different number of series of tubular elements, it is possible to obtain apparatus having different lengths of the relative straight portions and therefore to obtain various layout configurations for the packing machines of the pharmaceutical articles internally of the containers, also on the basis of the number of counting machines that are to be used.

FIGS. 9 and 10 illustrate a preferred embodiment of a transport device (9), for transport of a container element (TC) suitable for receiving and transferring articles, which is the object of the present invention, utilisable in particular in an apparatus for transfer of pharmaceutical articles from the outlet of a counting machine to internally of containers advancing in continuous mode along a conveyor line, such as the one described in two possible embodiments.

The device (9) comprises a support element (91) fixable to the container element (TC) which is to receive the articles to be transferred internally thereof, and which is predisposed to be constrained to a movement organ for moving the container element (TC); and at least a carriage (92) which is fixed to the support element (91).

The transport device (9) further comprises a pair of internal wheels (94) and a pair of external wheels (95) that are predisposed on the carriage (92) so that between the pair of internal wheels (94) and the pair of external wheels (95) there is space necessary for them to be able to engage, on opposite sides, with a guide rail and roll slidingly on the guide rail, for guided transport of the container element (TC) when it is set in motion by the relative movement organ, so that the container element (TC) can be stably maintained in a vertical position.

The peculiarity of the transport device (9) consists in the fact that the pair of internal wheels (94) are rotatably mounted on relative pins (940) which are predisposed on the carriage (92) by means of an elastic coupling so that the position of the relative axes can be elastically yielding.

In this way, the interaxis between the pins (940) can vary as a consequence of stresses to which the pair of internal wheels (94) can be subjected during running thereof along the guide rail, caused by a change of direction of the guide rail: this guarantees that the internal wheels (94) adapt to the change of pathway of the guide rail without there being any stresses transmitted to the container element (TC) which might compromise the stability thereof. Consequently the container element (TC) is kept constantly stable in the vertical position thereof.

Correspondingly, the pair of external wheels (95) are also rotatably mounted on relative pins (950) which are predisposed on the carriage (92) by means of an elastic coupling so that the position of the relative axes can be elastically yielding so that the interaxis between the pins (950) can vary as a consequence of stresses to which the pair of external wheels (95) can be subjected during running thereof along the guide rail caused by a change of direction of the guide rail.

In particular, on the basis of the preferred embodiment of the of the transport device (9) illustrated in the accompanying figures, the at least a carriage (92) comprises a central support part (96), for fixing to the support element (91), and two lateral parts (97), opposite the central part (96).

Each of the two lateral parts (97) comprises an internal region (971) made of an elastically yielding material and an external region (972) made of an elastically yielding material, with the pins (940, 950), on which the wheels (940, 950) of the pair of internal wheels (94) and the pair of external wheels (95) are rotatably mounted, being predisposed and mounted on said elastically yielding internal (971) and external (972) regions. In particular, the elastically yielding internal (971) and external (972) regions of each of the two lateral parts (97) of the carriage (92) exhibit a portion having a spiral shape (see FIG. 10), with the pins (940,950), on which the wheels (94, 95) of the pair of internal wheels (94) and the pair of external wheels (95) are rotatably mounted, which are mounted and predisposed in the central point of origin of the spiral portion.

Lastly, each of the internal (971) regions of the two lateral parts (97) of the carriage (92) exhibit a projecting edge (99) made of an elastic material, for abutting and sliding against a wall associated to the guide rail and arranged by a flank of and along the pathway of the guide rail, with the aim of further stabilize the position of the carriage (92) during running thereof along the guide rail.

To guarantee a greater stability of the container element (TC), the transport device (9) can also comprise a second carriage (920) having a shape, conformation and structure that are identical to the preceding first carriage (92), provided with a pair of internal wheels and a pair of external wheels, and which is mounted on the support element specularly, and inferiorly, to the first carriage (92), so that the relative internal and external wheels can engage and run on a second guide rail located at a lower level than the preceding guide rail on which the wheels of the first carriage (92) run.

The invention claimed is:

1. An apparatus for transferring pharmaceutical articles from at least a counting machine to internally of containers which advance in continuous mode along a conveyor line, the at least a counting machine exhibiting a storage zone, into which the articles are directed once counted, which is provided with an outlet for the articles, openable for release of the articles in a downwards direction, and which is laterally arranged and in a position at a level that is raised with respect to the containers to be filled which advance in continuous mode along the conveyor line, the apparatus comprising:

a first series of tubular elements having dimensions such as to be able to freely receive the pharmaceutical articles internally thereof;

and at least a second series of tubular elements having dimensions such as to be able to freely receive the pharmaceutical articles internally thereof;

movement means of the tubular elements of the first series of tubular elements and of the tubular elements of the second series of tubular elements, predisposed between the counting machine and the conveyor line of the containers for moving the first series of tubular elements and for moving the second series of tubular elements along a movement pathway such that the tubular elements of the first series of tubular elements and the tubular elements of the second series of tubular elements transit into a position below the outlet of the counting machine and travel along at least a portion of the movement pathway thereof above the containers advancing in continuous mode along the conveyor line, the movement means being further suitable for moving the first series of tubular elements and the second series of tubular elements along the movement pathway, independently of one another and in such a way that the first series of tubular elements and the second series of tubular elements can be movable along the movement pathway both with a step-step motion, so that each of the tubular elements of the first series of tubular elements and each of the tubular elements of the second series of tubular elements can respectively be stopped at the position below the outlet of the counting machine, for a time necessary to receive internally thereof the articles that have been counted and recognised as valid by the counting machine, which, with a continuous advancing modality so that the tubular elements, once the articles have been received from the counting machine, can travel along at least the portion above the containers, and follow the containers, with the same velocity as the containers advancing in continuous mode along the conveyor line, a support plate arranged so as to be positioned at a level such that the tubular elements of the first series of tubular elements and of the second series of tubular elements can slide on the plate, when they are moved by the movement means from the outlet of the counting machine up to above a container to be filled, so that the articles contained therein are retained internally thereof, wherein:

the movement means comprise a first looped movement organ for moving the first series of tubular elements and at least a second looped movement organ for moving the at least a second series of tubular elements, the first looped movement organ and the second looped movement organ being predisposed so as to be arranged one above another and movable by relative respective motor organs, and having a shape such as each to define a looped movement pathway for the tubular elements comprising a first straight movement portion of the tubular elements and a second straight movement portion of the tubular elements connected to one another by relative curved portions, the first movement organ and the second movement organ being arranged such that:

the first straight movement portion of the tubular elements exhibits a part passing at the position below the outlet of the counting machine, such that the tubular elements of the first series of tubular elements and the tubular elements of the second series of tubular elements can be stopped time by time in the position below the outlet of the counting machine for the time necessary for receiving internally thereof the counted articles from the counting machine, in that the second straight movement portion of the tubular elements is located at the portion above, and follows an extension, of the conveyor line of the containers, so that the tubular elements can be moved above the containers and follow the containers with a same velocity thereof along all the second straight movement portion, in that the support plate has a development and extension such as always to be arranged below the tubular elements when they are moved along the looped movement pathway thereof, at least starting from the part of the first straight movement portion situated in the position below the outlet of the counting machine, so as to enable unloading of the counted articles into the tubular elements when they are stopped below the outlet, up to at least a position situated upstream of and in proximity of a final portion of the second straight movement portion, in such a way that the tubular elements with the articles internally thereof, when moved along the second straight movement portion with the same velocity as and above the containers which advance in continuous mode along the conveyor line, pass beyond the plate and are directly above the mouth of the containers for the release therein of the articles only when they reach and advance along the final portion of the second straight movement portion, and in that it comprises guide and transport means of the first series of tubular elements and of the second series of tubular elements provided and predisposed to transport and guide the tubular elements of the first series of tubular elements and the tubular elements of the second series of tubular elements along the looped movement pathway such that the tubular elements are maintained arranged vertically and with the lower end thereof at a same predetermined distance from the support plate so as to retain the articles internally thereof during movement of the tubular elements on the plate, wherein the guide and transport means comprise:

at least a looped guide rail;

for each tubular element of the first series of tubular elements: a transport device predisposed for connecting the tubular element to the first movement organ and for following the guide rail, for each tubular element of the second series of tubular elements: a transport device predisposed for connecting the tubular element of the second series of tubular elements to the second movement organ and for following the guide rail, the at least a looped guide rail exhibiting a pathway and an extension having two straight portions connected to one another between two curved portions and such that:

when the first movement organ is actuated by the relative motor organ for moving the tubular elements of the first series of tubular elements, the transport device associated thereto runs on the looped guide rail, consequently forcing the tubular elements to follow the looped movement pathway while maintaining them stable in a vertical position so that when the tubular elements, once the articles have been received from the outlet of the counting machine, slide on the support plate, the lower end thereof is always at the predetermined distance from the plate;

when the second movement organ is actuated by the relative motor organ for moving the tubular elements of the second series of tubular elements, the transport device associated thereto runs on the looped guide rail, consequently forcing the tubular elements to follow the looped movement pathway while maintaining them stable in a vertical position so that when the tubular elements, once the articles have been received from the outlet of the counting machine, slide on the support plate, the lower end thereof is always at the predetermined distance from the plate, and in that:

the transport device of each tubular element of the first series of tubular elements comprises: a support element fixed to the tubular element and constrained to the first movement organ, at least a carriage fixed to the support element and provided with a pair of internal wheels and a pair of external wheels, the pair of internal wheels and the pair of external wheels are predisposed on the at least a carriage in such a way that when the support element is constrained to the first movement organ, the pair of internal wheels and the pair of external wheels engage the at least a guide rail on opposite sides thereof, the transport device of each tubular element of the second series of tubular elements comprises: a support element fixed to the tubular element and constrained to the second movement organ, at least a carriage fixed to the support element and provided with a pair of internal wheels and a pair of external wheels, the pair of internal wheels and the pair of external wheels are predisposed on the at least a carriage in such a way that when the support element is constrained to the second movement organ, the pair of internal wheels and the pair of external wheels engage the at least a guide rail on opposite sides thereof.

2. The apparatus of claim 1, wherein:
the pair of internal wheels, predisposed on the at least a carriage of the transport device of each of the tubular elements of the first series of tubular elements, are rotatably mounted on relative pins which are predisposed on the at least a carriage by means of an elastic coupling so that the position of the relative axes can be elastically yielding in such a way that the interaxis of the pins and therefore between the internal wheels can vary in consequence of a different stress to which the pairs of internal wheels can be subjected during running thereof and passage from a straight portion to a curved portion of the at least a guide rail, the pair of external wheels, predisposed on the at least a carriage of the transport device of each of the tubular elements of the first series of tubular elements, are rotatably mounted on relative pins which are also predisposed on the at least a carriage by an elastic coupling in such a way that the position of the relative axes can be elastically yielding so that the interaxis between the pins and therefore between the external wheels can vary in consequence of a different stress to which the pairs of external wheels can be subjected during running thereof and passage from a straight portion to a curved portion of the at least a guide rail,
and wherein:
the pair of internal wheels, predisposed on the at least a carriage of the transport device of each of the tubular elements of the second series of tubular elements, are rotatably mounted on relative pins which are also predisposed on the at least a carriage by an elastic coupling in such a way that the position of the relative axes can be elastically yielding so that the interaxis of the pins and therefore between the internal wheels can vary in consequence of a different stress to which the pairs of internal wheels can be subjected during running thereof and passage from a straight portion to a curved portion of the at least a guide rail, the pair of external wheels, predisposed on the at least a carriage of the transport device of each of the tubular elements of the second series of tubular elements, are rotatably mounted on relative pins which are also predisposed on the at least a carriage by an elastic coupling in such a way that the position of the relative axes can be elastically yielding so that the interaxis of the pins and therefore between the external wheels can vary in consequence of a different stress to which the pairs of external wheels can be subjected during running thereof and passage from a straight portion to a curved portion of the at least a guide rail.

3. The apparatus of claim 2, wherein the at least a carriage of the transport device of each of the tubular elements of the first series of tubular elements comprises a central support part, for fixing to the support element of the transport device, and two lateral parts, opposite the central part, with each of the two lateral parts comprising an internal region made of an elastically yielding material and an external region made of an elastically yielding material, with the pins, on which the wheels of the pair of internal wheels and the pair of external wheels are rotatably mounted, being predisposed and mounted on said elastically yielding internal and external regions; and in that the at least a carriage of the transport device of each of the tubular elements of the second series of tubular elements comprises a central support part, for fixing to the support element of the transport device, and two lateral parts, opposite the central part, with each of the two lateral parts comprising an internal region made of an elastically yielding material and an external region made of an elastically yielding material, with the pins, on which the wheels of the pair of internal wheels and the pair of external wheels are rotatably mounted, being predisposed and mounted on the elastically yielding, internal and external regions.

4. The apparatus of claim 3, wherein each of the internal regions of the two lateral parts of the carriage of the transport device of each of the tubular elements of the first series of tubular elements exhibits a projecting edge made of an elastic material, for abutting and sliding against a wall associated to the guide rail and arranged by a flank of and along the pathway of the guide rail, with the aim of further stabilize the position of the carriage, and therefore of the tubular elements, during running thereof along the guide rail, and each of the internal regions of the two lateral parts of the carriage of the transport device of each of the tubular elements of the second series of tubular elements exhibits a projecting edge made of an elastic material, for abutting and sliding against said wall associated to the guide rail and arranged by a flank of and along the pathway of the guide rail, with the aim of further stabilize the position of the carriage, and therefore of the tubular elements, during running thereof along the guide rail.

5. The apparatus of claim 1, wherein: each tubular element of the first series of tubular elements and each tubular element of the second series of tubular elements exhibits a tubular shape, in a cylindrical shape or in a polygonal shape, in particular square or rectangular, with a transversal section of greater dimensions than an opening of a mouth of the containers, and in that it comprises, for each tubular element of the first series of tubular elements and for each tubular element of the second series of tubular elements, a respective article unloading element which is borne by a common support element to which the tubular element is fixed in a lower position and coaxial to the relative tubular element so that one is superposed on the other and so that an opening is present between them which has dimensions of at least equal to the thickness of the support plate, in that the support plate is predisposed and mounted so as to be positioned at a height that is such that it is interposed to occupy the opening between the tubular element and the relative underlying article unloading element when the tubular element performs the looped movement pathway thereof from the position below the outlet of the counting machine up to the position of the beginning of the final portion of the second straight portion, so that the articles received by the tubular element are retained therein resting on the plate during movement thereof up to the start of the final portion of the second straight portion, and in that each article unloading element is internally hollow and provided with an inlet opening, in the relative upper end, having a transversal section at least equal to the transversal section of the relative overlying tubular element and an outlet opening, in the relative lower end, having a circular transversal section and a diameter corresponding to the diameter of the mouth of the containers, and in that each article unloading element is conformed such that the relative internal walls have a shape and an extension converging towards the outlet opening so that the relative internal volume decreases from the upper end to the lower end, in a funnel shape.

6. A conveyor device for conveying a container element for receiving and transferring articles, comprising:
- a support element fixable to the container element, and predisposed to be constrained to a movement organ for moving the container element,
- at least a carriage, fixed to the support element,
- a pair of internal wheels and a pair of external wheels predisposed on the carriage so that between the pair of internal wheels and the pair of external wheels there is space necessary for them to be able to engage with a guide rail and roll slidingly on the guide rail, for guided transport of the container element when it is set in motion by the relative movement organ, and in that:
- the pair of internal wheels are rotatably mounted on relative pins which are predisposed on the carriage by means of an elastic coupling so that the position of the relative axes can be elastically yielding so that the interaxis between the pins can vary as a consequence of stresses to which the pair of internal wheels can be subjected during running thereof along the guide rail, caused by a change of direction of the guide rail,
- the pair of external wheels are rotatably mounted on relative pins which are predisposed on the carriage by means of an elastic coupling so that the position of the relative axes can be elastically yielding so that the interaxis between the pins can vary as a consequence of stresses to which the pair of external wheels can be subjected during running thereof along the guide rail caused by a change of direction of the guide rail.

7. The device of claim 6, wherein the at least a carriage comprises a central support part, for fixing to the support element, and two lateral parts, opposite the central part, with each of the two lateral parts comprising an internal region made of an elastically yielding material and an external region made of an elastically yielding material, with the pins, on which the wheels of the pair of internal wheels and the pair of external wheels are rotatably mounted, being predisposed and mounted on the elastically yielding internal and external regions.

8. The device of claim 7, wherein the internal and external regions of each of the two lateral parts of the carriage, exhibit a portion having a spiral shape, with the pins, on which the wheels of the pair of internal wheels and the pair of external wheels are rotatably mounted, which are mounted and predisposed in the central point of origin of the spiral portion.

9. The device of claim 7, wherein each of the internal regions of the two lateral parts of the carriage exhibit a projecting edge made of an elastic material, for abutting and sliding against a wall associated to the guide rail and arranged by a flank of and along the pathway of the guide rail, with the aim further stabilize the position of the carriage during running thereof along the guide rail.

* * * * *